United States Patent [19]
Prosser

[11] 3,886,074
[45] May 27, 1975

[54] AIR DRIVEN ROTATING BIOLOGICAL CONTACTOR APPARATUS

[75] Inventor: David G. Prosser, River Hills, Wis.

[73] Assignee: Autotrol Corporation, Milwaukee, Wis.

[22] Filed: June 4, 1974

[21] Appl. No.: 475,641

Related U.S. Application Data
[63] Continuation-in-part of Ser. No. 370,219, June 15, 1973, abandoned.

[52] U.S. Cl. .................. 210/150; 210/221; 261/92
[51] Int. Cl. ........................................... B01d 21/00
[58] Field of Search .......... 60/22; 210/17, 150, 151, 210/220, 221; 261/92, 93, DIG. 71

[56] References Cited
UNITED STATES PATENTS

| | | | |
|---|---|---|---|
| 650,063 | 5/1900 | Kersten et al. | 60/22 |
| 3,325,154 | 6/1967 | McDonnell | 261/92 |
| 3,335,081 | 8/1967 | El-Naggar | 210/150 X |
| 3,361,781 | 1/1968 | Ziegler et al. | 261/92 |
| 3,827,559 | 8/1974 | Gass et al. | 210/150 |

Primary Examiner—Samih N. Zaharna
Assistant Examiner—Robert H. Spitzer
Attorney, Agent, or Firm—Quarles & Brady

[57] ABSTRACT

A biological wastewater treatment apparatus is disclosed in which a rotating biological contactor mounted on a horizontal shaft supported on a treatment tank has a plurality of pockets arrayed along the length of the contactor and at the outer periphery thereof. A gas conduit having a plurality of openings is disposed within the treatment tank and beneath submerged open pockets on the contactor. Air is admitted under pressure into the conduit and expelled through the openings. As the air rises to the surface it will be trapped in the pockets and cause the contactor assembly to rotate.

14 Claims, 14 Drawing Figures

PATENTED MAY 27 1975

3,886,074

SHEET 4

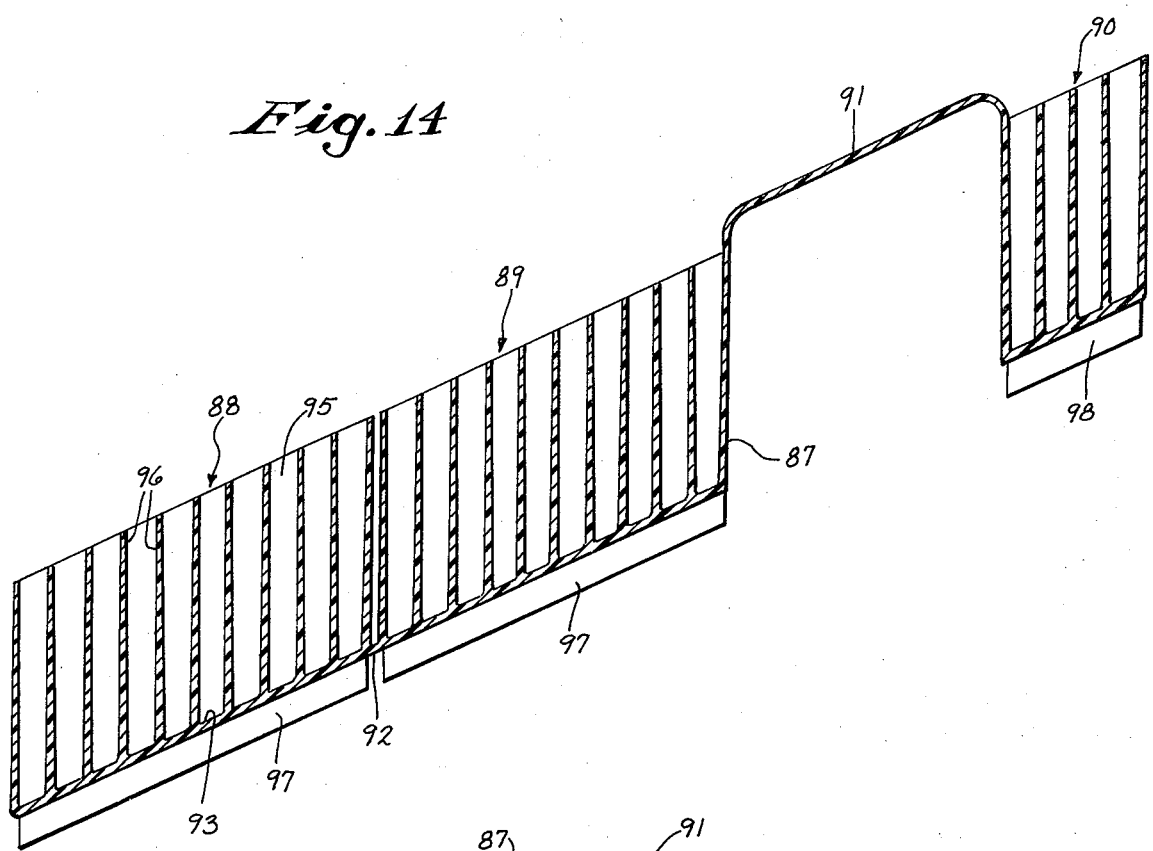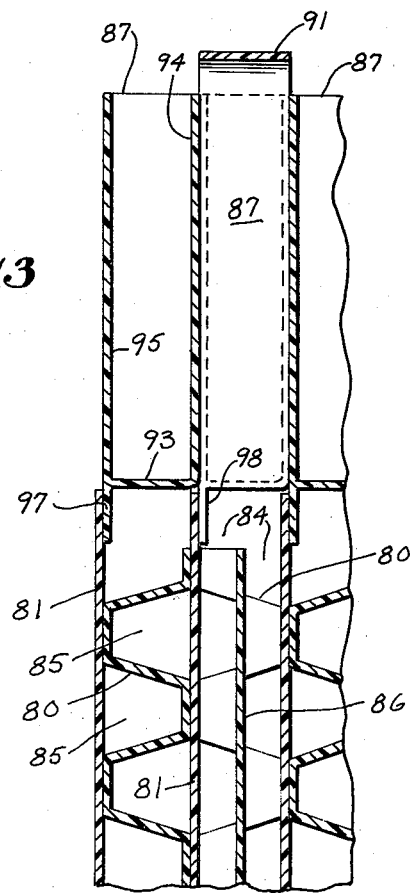

AIR DRIVEN ROTATING BIOLOGICAL CONTACTOR APPARATUS

CROSS-REFERENCE TO RELATED APPLICATION

This application is a continuation-in-part of my copending application Ser. No. 370,219, filed June 15, 1973, now abandoned.

BACKGROUND OF THE INVENTION

This invention relates to the biological treatment of wastewater, and more particularly to an improved air drive for rotating biological contactors.

Rotating biological contactors are known for use in the biological treatment of wastewater. The contactors are partially submerged and rotated in wastewater held in a tank or other container. Organisms present in the wastewater adhere to the rotating surfaces of the contactors until the entire submerged area of the contactors is covered with a layer of biomass. In rotation, the contactors carry a film of wastewater into the air which flows down the surface of the contactors and absorbs oxygen. Organisms in the biomass remove both dissolved oxygen and organic materials from this film of wastewater and the aerobic bacteria constituting the biomass have the ability to absorb, adsorb, coagulate and oxidize the undesirable organic constituents of the wastewater and to change them into unobjectionable forms of matter.

It has been common to drive the contactors by use of a motor, usually electric, connected through reduction gearing to a horizontal shaft which mounts the contactor. It has been suggested that lower installation and operating costs can be achieved by replacing the mechanical drive with a drive system employing air or other oxygen containing gas under pressure to rotate the contactor assembly. Specifically, it has been proposed to connect a separate rotor to the contactor at the axis of rotation of the contactor. The rotor could be mounted partially submerged with the contactor in the wastewater tank above an outlet for the gas under pressure. As gas is released, it would be trapped in the pockets formed between the vanes of the rotor thereby causing the rotor to rotate and to drive the contactor to which it is connected. The air or other oxygen containing gas used to propel the contactor assembly also contributes to the available oxygen to thereby improve the biological treatment of the wastewater.

This invention similarly employs air or other oxygen containing gas under pressure as the motive means for rotating the contactor. However, instead of driving a separate rotor connected to the contactor, in my invention the pockets or cups which trap the released air or gas are arrayed about the perimeter of the contactor and along its length. The air or gas under pressure is then released at multiple points beneath the length of the contactor. The rotating biological contactor assembly in accordance with my invention has the advantages of: utilizing the entire available tank dimension for rotating contactors in that a portion of the tank need not be occupied by a separate rotor; providing additional available oxygen along the entire length of the contactor for the biological treatment; requiring less force, and thus less gas under pressure, to rotate the contactor because of the increased moment arm resulting from locating the cups or pockets at the radially outermost point from the axis of rotation and because the thickness of the biomass is reduced thereby reducing the total weight required to be rotated; and resulting in a better distribution of stresses throughout the entire length of the contactor.

In addition, the provision of many small and relatively shallow pockets or cups (i.e., the depth of the pockets or cups being a minor portion of the radius of the contactor) arrayed about the perimeter and along the length of the contactor is significantly more efficient than employing a separate rotor with large pockets formed between vanes since only a small volume of air held in the small pockets is lost prematurely as the pockets approach the surface of the wastewater.

SUMMARY OF THE INVENTION

The invention comprises a wastewater treatment apparatus including a treatment tank, a generally circular rotating biological contactor assembly mounted for rotation about a horizontal axis and disposed to be partially submerged in the wastewater in the tank, a plurality of pockets arrayed along the length of the contactor assembly and disposed at the radially outermost surfaces of the contactor assembly, a source of an oxygen containing gas under pressure, and means for releasing said gas at submerged points disposed beneath the length of the contactor assembly, the pockets opening outwardly in a direction opposite to the direction of rotation of the contactor assembly to trap the released gas.

It is a principal object of this invention to provide an improved gas drive for a rotating biological contactor assembly.

It is another object of this invention to provide a biological wastewater treatment apparatus using a rotating biological contactor wherein the contactor is caused to rotate by air under pressure released beneath the surface of the wastewater and trapped in submerged pockets located along the length of the contactor and at the radially outer extremity of the contactor.

The foregoing and other objects and advantages of this invention will appear in the following detailed description of several preferred embodiments of the invention.

BRIEF DESCRIPTION OF THE DRAWINGS

FIG. 13 is a view in section taken in the plane of the line 13—13 of FIG. 10, and FIG. 14 is a view in vertical section taken through a pocket element as it would appear prior to its attachment to the contactor assembly of FIG. 10.

DESCRIPTION OF THE PREFERRED EMBODIMENTS

Figure 1:
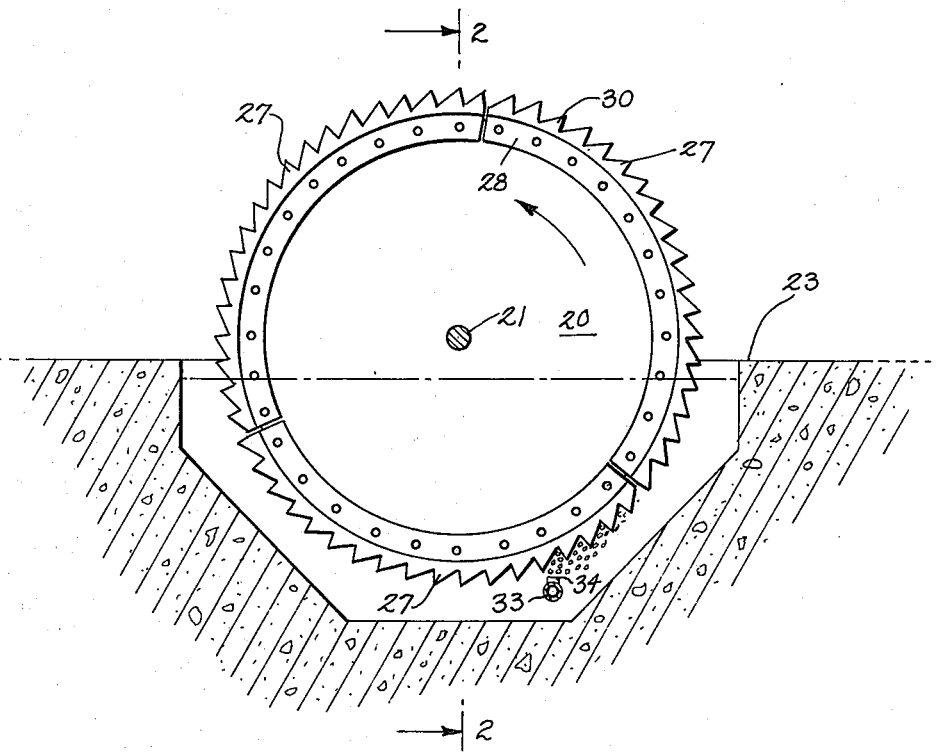
FIG. 1 is an end view in elevation of a disc type rotating biological contactor installation incorporating the present invention.

Referring to FIGS. 1-4 which illustrate a first embodiment of the invention, a rotating biological contactor is shown consisting of a series of flat circular discs 20 spaced uniformly along, and mounted on, a horizontal shaft 21. The shaft 21 is rotatably supported in bearings 22 on the tops of the ends of an inground concrete tank 23. A wastewater inlet pipe 24 extends through one end of the tank 23 and treated water will flow over a weir 25 and out of an outlet pipe 26 disposed at the opposite end of the tank 23. The same style of tank may be used with each of the preferred embodiments.

A plurality of arcuate pocket members 27 are joined to the periphery of every other one of the flat discs 20. Specifically, each of the pocket members 27 is formed as an arc of a circle with a pair of spaced inwardly directed flanges 28 depending from a base portion 29 and with outwardly extending wedge-shaped pockets or cups each defined by side walls 30 rising from the base portion 29 and an inclined top wall 31 spanning the side walls 30. The flanges 28 are spaced apart a distance equal to the thickness of each disc 20 and may be attached to the discs by suitable fasteners such as rivets 32, or bolts. A complete circle of pocket members 27 are formed about alternate discs 20 by placing a series of the pocket members 27 end to end. The width of the pocket members 27 measured along the axis of rotation is selected to insure that sufficient space remains between adjacent series of pocket members 27 for good wastewater flow against the entire surfaces of all discs 20. Thus, the width of a pocket member 27 should not normally exceed twice the spacing between discs.

A gas conduit 33 extends along the length of the tank 23 between the bottom of the tank and the contactor assembly. The conduit 33 is provided with a series of nozzles 34 disposed at the approximate location of each disc 20 having pocket members 27. The conduit 33 and nozzles 34 are disposed toward the ascending side of the pocket elements 27 offset from a vertical plane through the axis of the shaft 21. The conduit 33 leads from a source of air under pressure such as a pressure blower 35 driven by a motor (not shown). As can be seen in FIG. 1, each of the wedge-shaped pockets opens outwardly and is inclined in a direction opposite to the desired counterclockwise direction of rotation of the contactor assembly. Thus, as air is forced by the pressure blower 35 into the conduit 33 and out of the nozzles 34, the air will bubble upwardly through the wastewater and will be trapped in the open submerged pockets. The accumulation of air in the submerged pockets will cause the contactor assembly to rotate in a counterclockwise direction as viewed in FIG. 1.

As the discs 20 are rotated, the disc surfaces, as well as the surfaces of the pocket members 27 will alternately be exposed to the wastewater and to the air above the wastewater so that a biomass will form on such surfaces consisting essentially of aerobic bacteria which will utilize the oxygen in the air above the wastewater and the nutrients in the wastewater for its growth. The wastewater will thereby be purified. Normally in the use of rotating contactors, when the growth of biomass on the surfaces of the discs becomes so great that it is unable to support its own weight it will slough off. As will be more fully explained hereafter, the air beneath the length of the contactor has been observed to result in a thinner growth of biomass, due in part no doubt to a shearing effect of the air bubbles which do not become trapped in the pockets as they pass over the contactor surfaces. The space between the pocket members 27 provided on alternate discs 20 permits complete access of wastewater and air to all of the surfaces and egress for sloughed off solids. The air emitted from the nozzles 34 will also provide an additional source of oxygen which will hasten and improve the biological treatment of the wastewater. The bubbling air along the length of the tank will also aid in keeping all solids in suspension in the wastewater so that they may be carried out with the overflow and be settled out in a subsequent stage of treatment.

Figure 2:
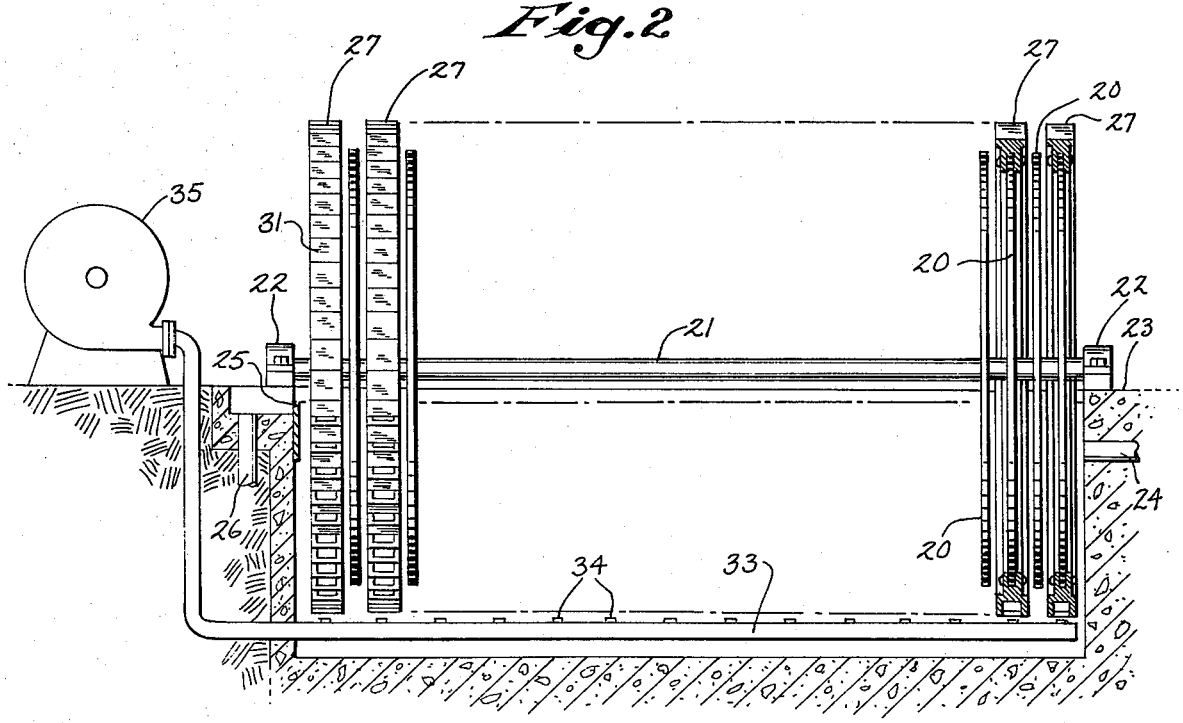
FIG. 2 is a view in side elevation of the contactor installation of FIG. 1 with portions of the pocket members shown in section.
Figure 3:
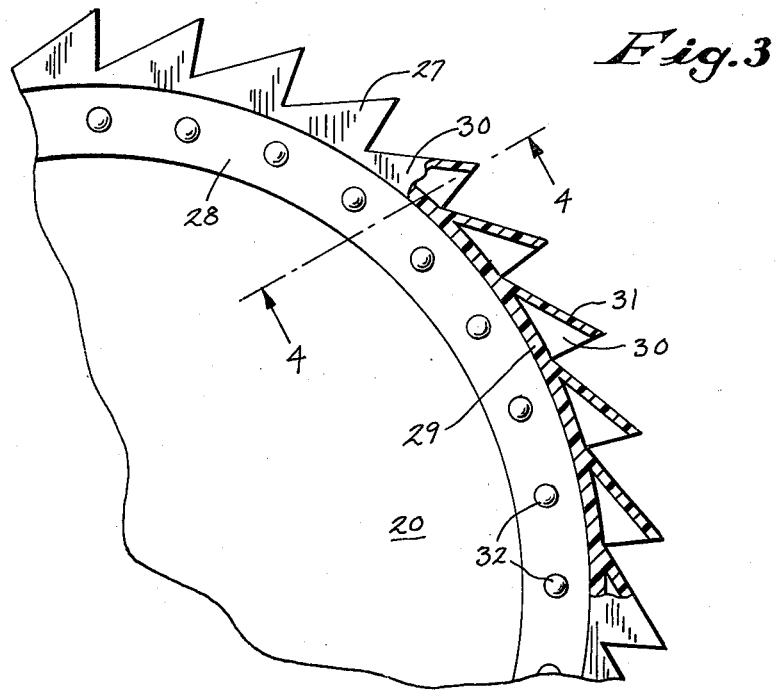
FIG. 3 is an enlarged end view, partially in section, of the embodiment of FIG. 1 illustrating the pocket members in greater detail.
Figure 4:
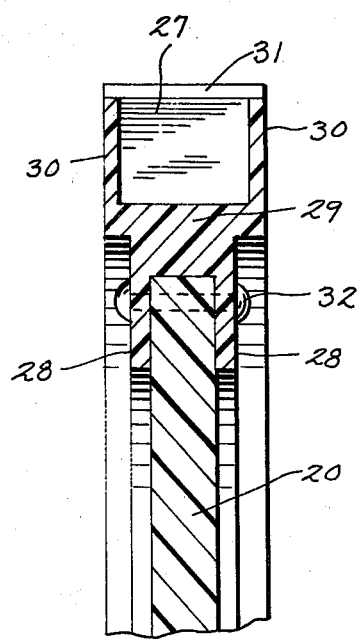
FIG. 4 is a view in section taken in the plane of the line 4—4 of FIG. 3.

As can be seen from FIG. 2, the pocket members 27 do not diminish or reduce the available tank length which can be occupied by discs 20. As such, they do not require a larger tank than would be required for an assembly of discs driven mechanically. The pocket members 27 actually add to the available working surfaces upon which a biomass can grow, even if the disc diameter is reduced to permit the use of existing tanks of given widths and depths. Since the pockets are disposed at the greatest available distance from the axis of rotation, a large moment arm results which has the effect of requiring less force to rotate the contactor assembly and also less air to provide the necessary rotational force. Because the contactor assembly is driven at its periphery, lower stresses on the contactor assembly result as compared with driving the assembly through the shaft as would be accomplished with a mechanical drive or with a separate air driven rotor attached to the shaft. Also by spreading the force along the entire length of the contactor, the stress on the pocket members is reduced.

As the pockets approach the surface of the wastewater in the tank 23, the bouyant force of the air trapped therein will be operating through the maximum moment arm and will thus be providing the maximum torque to drive the contactor. It is therefore important to insure that significant volumes of air are not prematurely lost from the pockets as the pockets approach this maximum torque position. By using many closely spaced pockets having relatively small openings along the entire length of the contactor, a significantly smaller volume of air will escape from the pockets as they near the wastewater surface than would result from using a separate rotor with large pockets. If a separate rotor were provided with pockets with small openings, they would necessarily be very deep to provide sufficient torque and such pockets could not be sufficiently evacuated of water and filled with air unless operated at very low speeds. Accordingly, by the use of many shallow pockets whose depth represents only a minor portion of the radius of the contactor, the necessary evacuation of water from the pockets and the filling of the pockets with air can be achieved at reasonable rotational speeds.

It often happens that the growth of the biomass on the surfaces of rotating contactors will not be uniform in thickness thereby resulting in unbalanced loads. With a mechanical drive using an electric motor it has been found necessary to employ oversize motors which can accommodate the maximum torque requirements resulting from unbalanced loading. This increases the cost of driving the contactor. By the use of an oxygen containing gas as the propulsion medium, unbalanced loading does not effect the power requirements since the media will slow down and speed up due to unbalanced loading. Then by supplying the gas at a constant rate, the speed of the contactor will automatically regulate the amount of gas trapped in the cups and thus regulate the driving torque provided by the gas. That is, when the contactor slows down as the unbalanced load ascends the pockets will be over the nozzles 34 for a greater length of time and will fill more completely with air to provide maximum torque for raising the unbalanced load. Conversely, as the unbalanced load descends, the pockets will move faster past the nozzles 34 and thus fill less completely with air so that the driving torque is reduced and the force of gravity contributes to the rotation of the contactor.

The admission of the oxygen containing gas along the entire length of the contactor contributes to the biological treatment. Bubbles of gas which are not trapped in the pockets will pass along the surfaces of the contactor and some will be held on the surface so that the biomass can assimilate the oxygen directly.

The flat discs 20 are conventionally formed of foamed polystyrene and the pocket members 27 are preferably formed from an inexpensive molded synthetic plastic material such as polyethylene so that the weight of the discs 20 and attached pocket members 27 is low.

Figure 5:
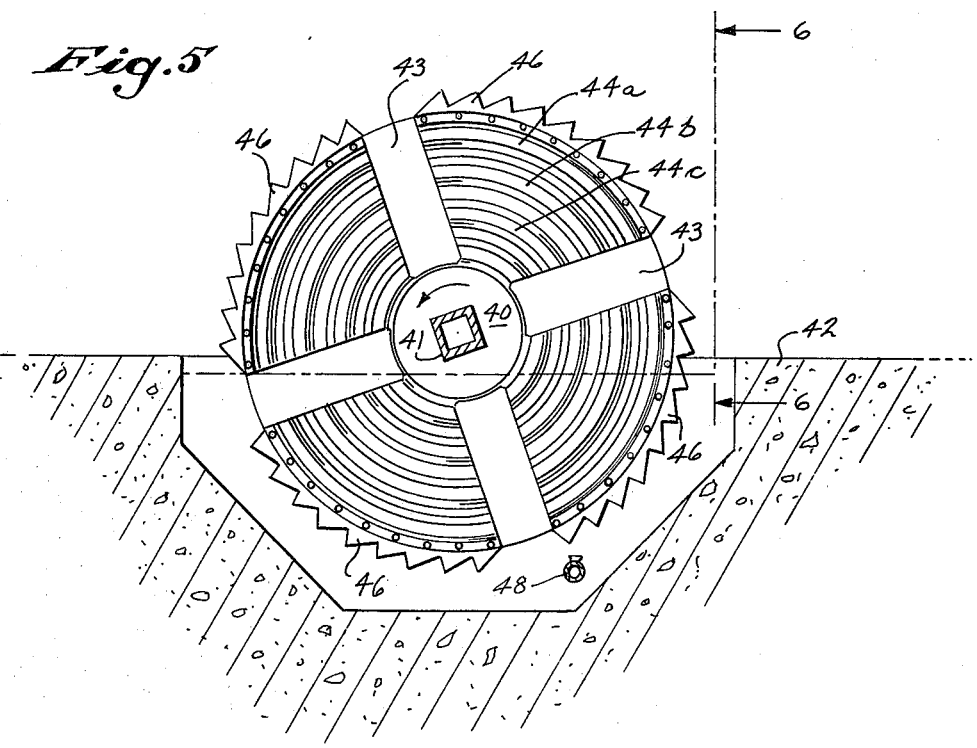
FIG. 5 is an end view in elevation of an extended surface rotating biological contactor incorporating another form of the present invention.
Figure 6:
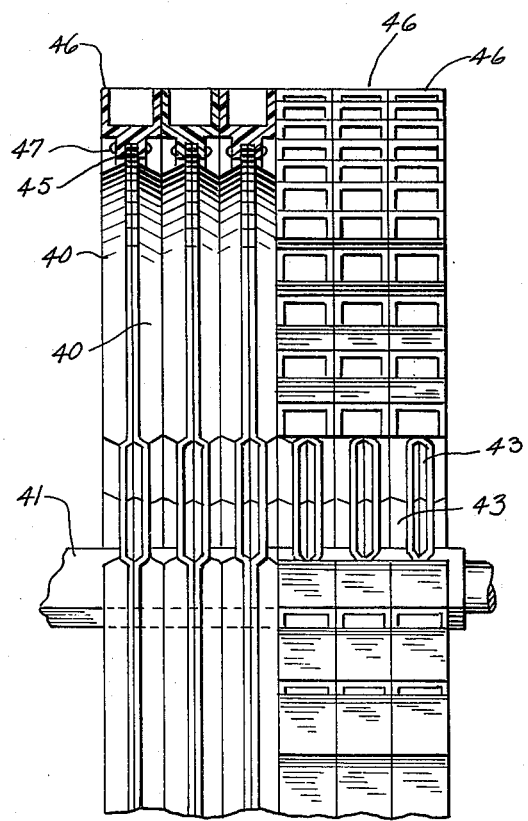
FIG. 6 is a partial view in side elevation taken from the plane of the line 6—6 of FIG. 5, with portions of pocket members shown in section.

In FIGS. 5 and 6, the invention is shown incorporated with a form of rotating biological contactor comprised of separate formed, thin wall, identical sheets 40 joined face to face and back to back and supported on a hollow square shaft 41 mounted for rotation in a tank 42. The form of rotating biological contactor employed in the embodiment of FIGS. 5 and 6 is fully disclosed and described in the copending application of Donald N. Gass and David G. Prosser entitled "Extended Surface Rotating Biological Contactor," filed May 10, 1972, Ser. No. 252,038, now U.S. Pat. No. 3,827,559, issued Aug. 6, 1974, and assigned to the assignee of this invention. The sheets 40 are so formed that, when joined together, they will define a plurality of spaced radial passages 43 emanating from a central hub portion and opening to the periphery of the contactor, and a series of concentric passages 44a, b, c, etc., generally hexagonal in cross section. The concentric passages 44a, b, c, etc., extend between adjacent radial passages 43 and are open to a radial passage 43 at each end.

As seen in FIG. 6, when a pair of sheets 40 are joined together a flange 45 is formed comprising the flat peripheral edges of each sheet 40 extending between the radial passages 43. Arcuate pocket elements 46 are attached to such flanges 45 and extend along the perimeter of each pair of sheets 40 between the adjacent spaced radial passages 43. The pocket elements 46 may be similar in shape and construction to the pocket members 27 of the first embodiment and are joined to the flanges 45 by suitable fasteners such as rivets 47. As can be seen in FIG. 6, pocket elements 46 are mounted on each pair of sheets 40 and the width of a pocket element 46 is the same as the width of two sheets 40. Axial spaces are not provided between adjacent pocket elements as was the case in the first embodiment. This is because the radial passages 43 provide the entrance and exit for wastewater flowing into the interior concentric passages 44 of the contactor, and for sloughed off solids.

As with the first embodiment, a gas conduit 48 is disposed along the length of the tank 42 with outlets along its length beneath the submerged open pockets of the elements 46. As the contactor is caused to rotate by the buoyancy of air trapped in the submerged pockets of elements 46, some of the bubbling air will enter and pass through the radial passages 43 and interior concentric passages 44. This air will displace some of the wastewater in the interior concentric passages 44 thereby assisting the mixing of wastewater in the interior of the contactor with wastewater in the tank 42. Furthermore, as the air passes through the interior passages of the contactor, it will flush such passages with an additional source of oxygen. Therefore, although some power to rotate the contactor is lost by air from the conduit 48 entering the interior of the contactor through the radial passages 43, a very desirable mixing action results which will assist the biological purification of the wastewater.

Again, the embodiment of FIGS. 5 and 6 does not require enlargement of tanks or reduction in the length of the contactor assembly to achieve the air drive. While the diameter of the sheets 40 may be reduced to accommodate the added radial dimension of the pocket elements 46, the pocket elements 46 can be so proportioned that they provide the same surface area for the growth of the biomass as that lost by the reduction in diameter of the sheets 40.

Figure 7:
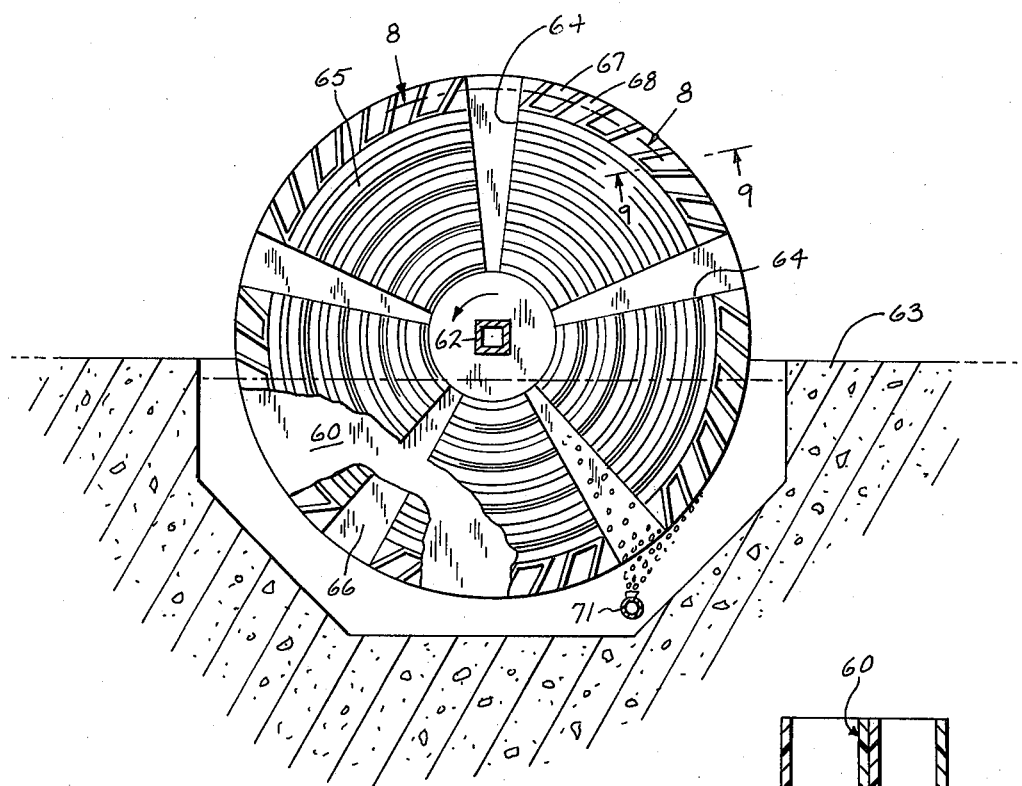
FIG. 7 is an end view in elevation of a further form of extended surface contactor and including integrally formed pockets or cups.
Figure 9:
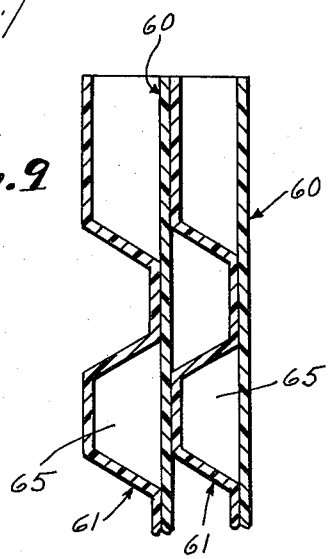
FIG. 9 is a view in section taken in the plane of the line 9—9 of FIG. 7.
Figure 8:
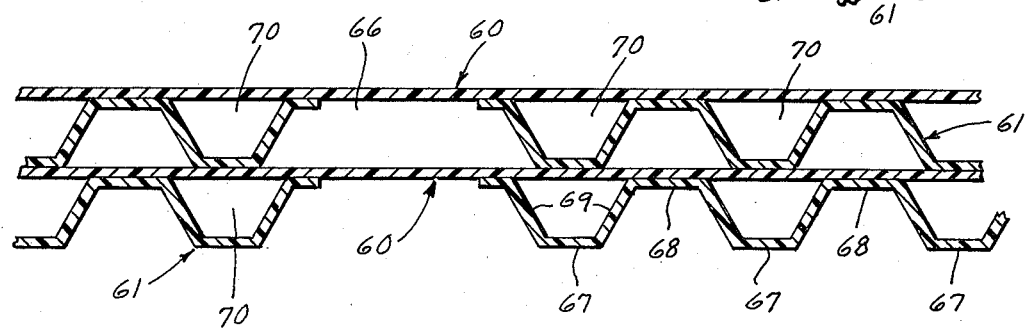
FIG. 8 is a view in section taken in the plane of the line 8—8 of FIG. 7.

Referring now to the embodiment of FIGS. 7–9, the invention is shown in connection with another form of extended surface rotating biological contactor similar to that disclosed in the aforementioned copending application of Gass and Prosser. In the embodiment of FIGS. 7 and 8, the pockets or cups are formed integral with the sheets comprising the extended surface contactor. That is, the contactor is formed of alternate thin wall flat sheets 60 and thin wall formed sheets 61, with each pair of flat and formed sheets 60 and 61 defining a disc element. The sheets 60 and 61 are preferably vacuum formed from polyethylene. The assembly of disc elements is mounted on a hollow square shaft 62 supported for rotation on a tank 63. The flat sheets 60 are continuous, but the formed sheets 61 are provided with spaced radial cutouts 64 extending outwardly from a central hub portion and increasing in width as the distance from the shaft 62 increases.

The formed sheets 61 are shaped to form the concentric passages 65 between each formed sheet 61 and the flat sheets 60 to each side. The concentric passages 65 are each open at their ends at the radial cutouts 64 so that the cutouts 64 together with the flat sheets 60 to each side of a formed sheet 61 define radial passages 66.

Adjacent the peripheral edges of the formed sheets 61, the sheets 61 are shaped with spaced apart end wall portions 67 and 68 which lie in the two end planes of the formed sheets 61 and which are joined by connecting wall portions 69. The end wall portions 67 and 68 are inclined with respect to the radius of the sheets 61 in a direction generally opposite to the direction of rotation of the contactor so that the formed sheets 61 will define a series of pockets or cups 70 with a flat sheet 60. The pockets 70 will trap air released under pressure by a conduit 71 running the length of the tank 63.

The embodiment of FIGS. 10–15 also incorporates extended surface rotating biological contactor technology in that it comprises a series of flat and formed sheets joined together to define circumferential passages and spaced radial passages. Specifically, the contactor is formed of a series of formed circular sectors 80 and flat circular sectors 81. Each formed and flat sector 80 and 81 is joined together to form a disc element sector 82 and a plurality of the disc element sectors 82 then define one layer of disc element. The disc element sectors 82 at each layer along the length of a square hollow shaft 83 are angularly offset from the sectors at the adjacent layer by one-half of the angular width of a sector.

Figure 10:
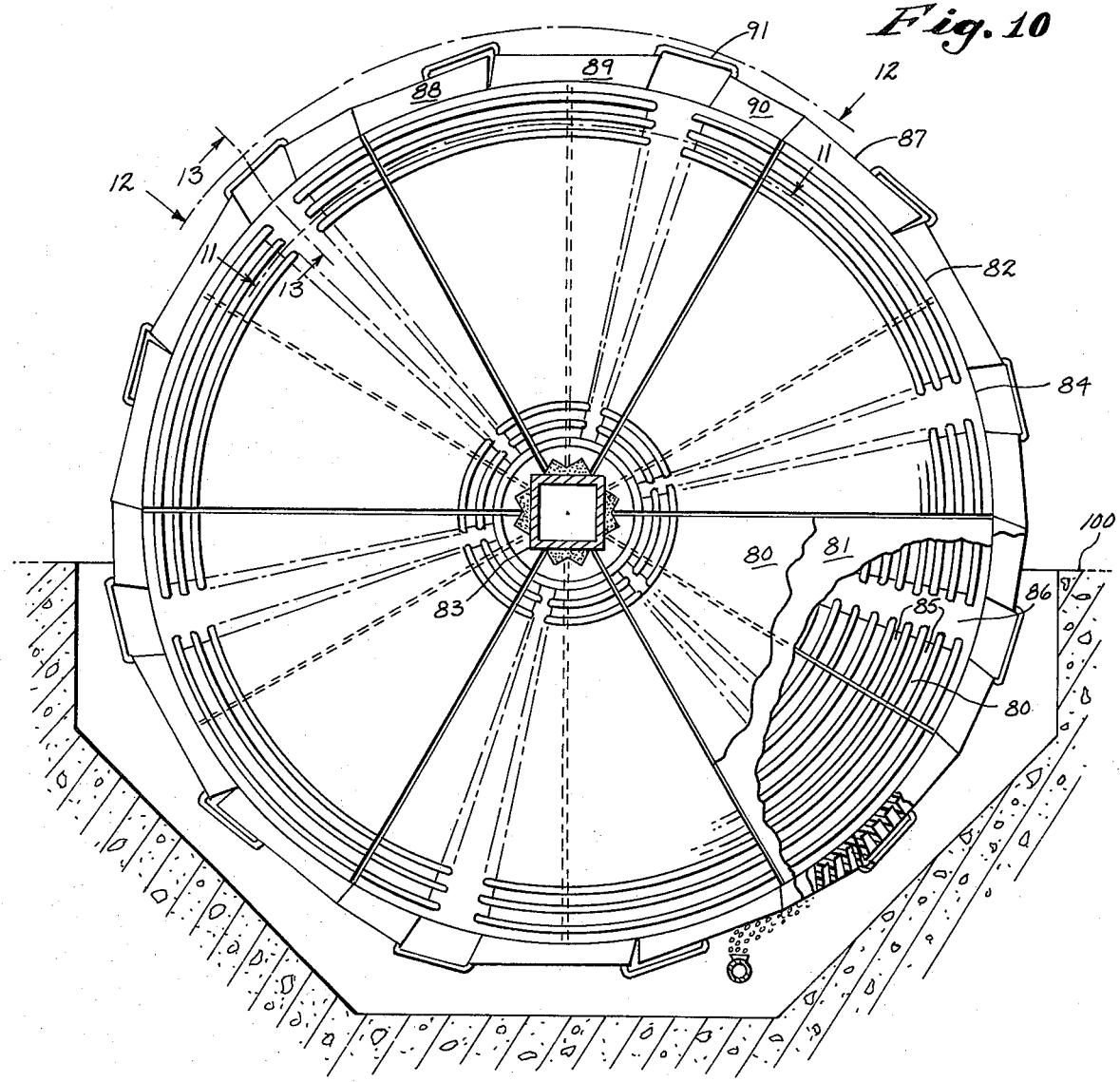
FIG. 10 is an end view in elevation of still another form of an extended surface contactor incorporating another embodiment of the present invention.
Figure 11:
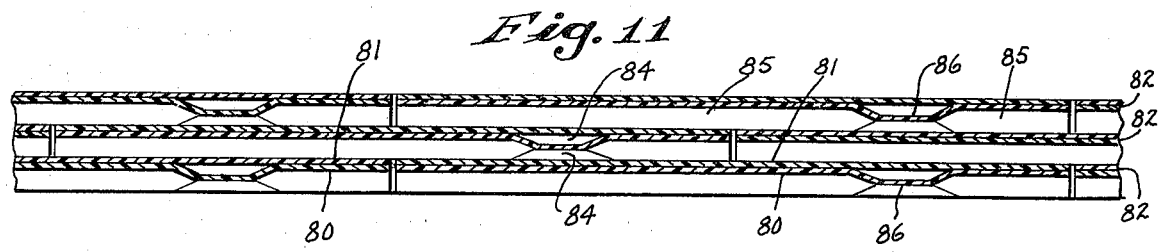
FIG. 11 is a view in section taken in the plane of the line 11—11 of FIG. 10.
Figure 12:
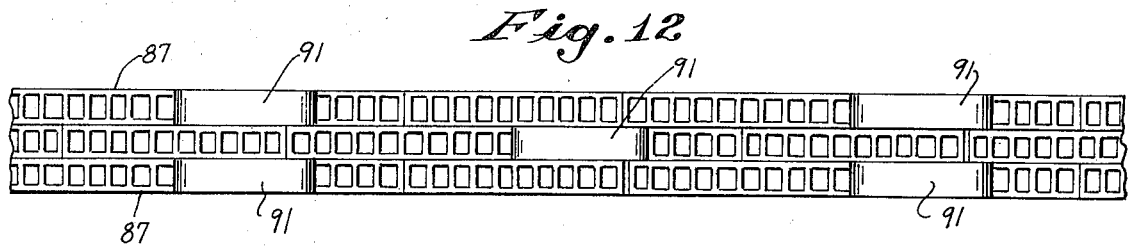
FIG. 12 is a plan view of a portion of the contactor of FIG. 10 taken from the plane of the line 12—12 of FIG. 10.

The formed sectors 81 may be identical and each is formed to define a radial passage 84 within each sector and a plurality of concentric passages 85 opening to the radial passage 84 and extending to the edges of the sector. The concentric passages 85 are defined between the formed sectors 80 and the flat sectors 81 to either side thereof and the radial passages 84 are defined between a midwall 86 of each formed sector 80 and the flat sectors 81 to each side. The midwall 86 is located in a plane halfway between the spaced planes of the extreme end walls of each formed sector 80. The concentric passages 85 within one sector 82 are aligned with the concentric passages of the sectors 82 to each side in the same layer. As seen in FIGS. 10 and 11, the midwalls 86 defining the location of the radial passages 84 are disposed off center of each formed sector 80 and, because the formed sectors at adjacent layers are angularly displaced, a pattern of radial passages 84 results which is staggered from one layer to the next.

A plurality of pocket members 87 surround the perimeter of the contactor assembly with one pocket member 87 disposed at the edge of each disc element sector 82. In FIG. 14, a pocket member 87 is shown in section in the form in which it is manufactured and as it would appear prior to attachment to a disc sector 82. Each pocket member 87 consists of two large cup portions 88 and 89, a short cup portion 90 and a bridge portion 91. The cup portions 88 and 89 are connected together at a web 92 formed as a continuation of a common bottom wall 93 shared by the cup portions 88 and 89. The cup portions 88 and 89 each include a series of deep cups defined between spaced side walls 94 and 95 and upright partitions 96. A flange 97 depends from each cup portion 88 and 89 in the plane of the side wall 95. The small cup portion 90 is similarly provided with a series of cups defined by side walls and upright partitions and also has a depending flange 98. The small cup portion 90 is joined to the longer cup portion 89 by the bridge 91 which is spaced above the top openings of the cups. The pocket members 87 may be economically molded from a plastic material such as polyethylene.

A pocket member 87 is joined to a disc element sector 82 by connecting the flanges 97 and 98 to the peripheral edge portions of the flat sectors 81, as shown in FIG. 13. The pocket members 87 will flex at the web 92 and the bridge portion 91 so as to accommodate the curve of the periphery of the sector. The bridge 91 is aligned with the radial passages 84 in the disc element sector 82 to which the pocket member 87 is attached. The width of the pocket member 87 is made equal to the width of the sector 82 so that the pocket members 87 occupy the entire outer surface of the contactor. As may be seen, the bridge portions 91 project sufficiently beyond the cups 88, 89 and 90 so as to permit the flow of fluid into and out of the radial passages 84 and beyond the cups disposed to either side. The total area of the openings to both sides of each bridge portion 91 is selected to be at least as great as the area of the radial passage so that maximum flow is permitted. As with all of the previous embodiments, a conduit 99 is disposed within the tank 100 with spaced openings beneath the open submerged cups.

By forming each pocket member 87 as one piece to be attached to each disc sector 82, complete sectors 82 with attached pocket members 87 can be fabricated and then joined together to form successive layers of the contactor. To facilitate assembly, the inner perimeter of each sector 82 is defined by a series of squares of the same size as the shaft 83 and angularly displaced from each other by a fixed angle. The spaces between the outer surface of the square shaft 82 and the inner perimeters of the sectors 82, and the space between adjacent sectors 82 at the shaft 82 is preferably filled with a rigid plastic foam.

The bridge portions 91 function not only to tie together the cup portions 88, 89 and 90 so that a single unit can be used, but also to act as air deflectors to minimize the loss of bubbling air into the interior of the contactor through the radial passages 84. That is, since the bridge portions 91 cover the radial passages 84, air bubbling up from the conduit 99 which would tend to enter the radial passages 84 will be deflected by the bridge portions 91 to the adjacent submerged cups. This minimizes the loss of air to non-driving areas of the contactor and will reduce power consumption. Where power consumption is not a principal consideration, the bridge portions 91 may be omitted and the desired mixing action referred to above in connection with the embodiment of FIGS. 5 and 6 will result.

Laboratory tests of a contactor substantially like that of the embodiment of FIGS. 10 through 14, but without the bridge portions 91, have been carried out and compared with similar tests of an identical contactor without cups and driven mechanically. Both contactor had an overall diameter of 12 feet and were 3 feet in length. The waste treated by both was a concentrated dairy waste having a biological oxygen demand (B.O.D) of between 1,200 and 1,500 milligrams per liter. The mechanical drive contactor unit was rotated at 1.6 RPM and the air drive contactor unit was driven at 0.8 RPM by air discharged at the rate of 11 standard cubic feet per minute. Even though the speed was half that of the mechanical drive unit, the air drive unit achieved an equal performance level (i.e., B.O.D. removal of about 80%). The thickness of the biomass on the air driven unit was only half that on the mechanically driven unit thereby reducing the weight of the contactor and reducing the horsepower needed for rotation. It is believed that the thinner biomass results both from a mechanical shearing action of the air not trapped in the cups surging over the surfaces of the contactor and from a biological change in the biomass. It has been noted that the pH of the effluent from the air drive test unit was greater than from the mechanical drive unit and as a result bacterial growth predominates in the biomass. Bacterial growth produces a lighter biomass than produced by fungic growth which will predominate at a lower pH. The tests also show that the dissolved oxygen in the effluent of the air drive unit is greater than in the mechanical drive unit.

Not only does the lower weight of the biomass reduce the horsepower requirements for rotating the unit, it also reduces the shear forces on the contactor.

The same reduction in biomass thickness, and increase in pH, has been observed in a similar mechanically driven unit in which air is discharged along the length of the bottom of the tank. The air is not used for propulsion but to supplement the available oxygen for biological activity. Thus, the power requirements to mechanically drive a rotating contactor can be reduced by the addition of supplemental air, but the power requirements would still be significantly greater than that of the present invention because power would be required to supply the air for discharge into the tank as well as to mechanically rotate the contactor.

A biological wastewater treatment apparatus in accordance with this invention provides the optimum utilization of an oxygen containing gas to rotate the contactor, with a minimum utilization of power, keep the stresses on the contactor at a minimum, reduce the weight of the biomass on the contactor, unaffected by unbalanced load, and all without reducing the efficiency of the biological treatment.

I claim:

1. A biological wastewater treatment apparatus, comprising:
   a treatment tank having a fluid inlet and a fluid outlet,
   a generally circular rotating biological contactor assembly mounted for rotation about a horizontal axis and disposed in said tank for partial submergence in the wastewater in the tank,
   a plurality of pockets arrayed along the length of said contactor assembly and disposed at the radially outer surfaces of said contactor assembly, said pockets having a depth which is a minor portion of the radius of said contactor assembly,
   a source of oxygen containing gas under pressure, and
   a gas conduit leading from said source of gas into said tank and having submerged openings disposed beneath the length of said contactor assembly,
   said pockets each opening outwardly in a direction opposite to the direction of rotation of said contactor assembly to trap gas released froom said conduit.

2. A biological wastewater treatment apparatus in accordance with claim 1, wherein
   said contactor assembly comprises a plurality of flat, circular discs closely spaced along said horizontal axis,
   and said pockets are disposed about the periphery of selected, non-adjacent ones of said discs.

3. A biological wastewater treatment apparatus in accordance with claim 2, wherein
   said pockets surround the entire periphery of every other one of said discs.

4. A biological wastewater treatment apparatus in accordance with claim 3, wherein
   said pockets are formed on a plurality of identical arcuate members each including spaced radially inwardly directed flanges which receive the outer edge of a disc and are joined thereto.

5. A biological wastewater treatment apparatus in accordance with claim 1, wherein
   said contactor assembly comprises an array of disc elements juxtaposed along said horizontal axis, and having a plurality of spaced, radially directed, discrete passages open at the periphery of said disc elements, and a series of internal, generally concentric, discrete passages open at each end to a radially directed passage,
   and said pockets extend along the perimeter of each disc element between the peripheral openings of the radially directed passages.

6. A biological wastewater treatment apparatus in accordance with claim 5, wherein
   said radially directed passages are equally spaced about said disc elements, and
   said pockets are formed on a plurality of identical arcuate members.

7. A biological wastewater treatment apparatus in accordance with claim 6, wherein
   each of said disc elements is comprised of a pair of identical, thin wall, formed sheets joined face to face with a peripheral flange extending between the peripheral openings of said radially directed passages, and
   said arcuate members each include a pair of spaced radially inwardly directed flanges which receive and are joined to the flange of said disc elements.

8. A biological wastewater treatment apparatus in accordance with claim 5, wherein
   each of said disc elements is comprised of a circular, thin wall, flat sheet and a circular, thin wall, formed sheet joined to said flat sheet and abutting against the flat sheet of the adjacent disc element.

9. A biological wastewater treatment apparatus in accordance with claim 5, wherein
   said radial passages of each disc element are radially offset from the radial passages of the disc elements to either side, and
   said pockets are formed on a plurality of identical pocket members each including a bridge portion spanning the peripheral opening of each radial passage and disposed radially outwardly of the level of the pockets of the pocket members on adjacent disc elements.

10. A biological wastewater treatment apparatus in accordance with claim 9, wherein
    each disc element is comprised of identical disc element sectors each including a flat, thin wall, circular sector sheet and a formed, thin wall, circular sector sheet joined to the flat sheet and defining a radial passage and a plurality of concentric passages with said flat sheet and with the flat sheet of an adjacent disc element,
    and one of said pocket members is joined to the peripheral edge of each flat sector sheet, said bridge portion connecting pockets disposed to each side of the bridge member.

11. A biological wastewater treatment apparatus, comprising:
a treatment tank having a fluid inlet and a fluid outlet,
a plurality of flat, uniformly spaced, circular discs mounted on a horizontal shaft and disposed in said tank for partial submergence in the wastewater in the tank,
a plurality of cups attached to the perimeter of alternate ones of discs, said cups having a width less than twice the spacing between adjacent discs, and said cups opening outwardly and inclined in one direction from the radius of the disc,
a source of air under pressure, and
a gas conduit leading from said source of air into said tank, said conduit having a plurality of submerged air openings disposed between the bottom of said tank and each cup carrying disc and beneath open submerged cups.

12. A biological wastewater treatment apparatus, comprising:
a treatment tank having a fluid inlet and a fluid outlet,
an array of thin wall, generally circular formed sheets joined alternately face to face and back to back along a horizontal shaft and disposed in said tank for partial submergence in the wastewater in said tank,
each sheet being formed with walls defining one half of a plurality of radial passages uniformally circumferentially spaced about said sheet and open to the periphery of the sheet,
each sheet being also formed with walls defining one half of a plurality of concentric passages extending between adjacent pairs of radial passages and open at each end to a radial passage,
a plurality of arcuate elements joined to each pair of sheets, each arcuate element extending along the perimeter of a pair of sheets between each pair of radial openings,
said arcuate element each containing a series of cups which are open outwardly and inclined in one direction from the radius of said sheets, said cups having a width equal to the width of a pair of sheets,
a source of air under pressure,
and a conduit leading from said source of air into said tank and including a plurality of submerged outlets disposed along the length of said tank beneath submerged open cups.

13. A biological wastewater treatment apparatus, comprising:
a treatment tank having a fluid inlet and a fluid outlet,
an array of generally circular sheets juxtaposed along a horizontal shaft and mounted in said tank for partial submergence in the wastewater in said tank,
adjacent sheets defining a plurality of circumferentially spaced, radial passages open to the periphery of the sheets, a series of generally concentric discrete passages extending between each pair of radial passages and open at each end to a radial passage, and a plurality of peripheral pockets extending the peripheral openings of said radial passages, said pockets opening outwardly and being inclined in one direction from the radius of said sheet,
a source of air under pressure,
and a conduit leading from said source of air into said tank and having a plurality of submerged air outlets disposed along the length of said tank and beneath submerged open pockets.

14. A biological wastewater treatment apparatus, comprising:
a treatment tank having a fluid inlet and a fluid outlet,
a circular rotating biological contactor assembly having a horizontal axis of rotation and adapted for partial submergence in the wastewater in said tank, said contactor assembly including successive layers of disc elements each comprised of a plurality of circular sectors,
each circular sector including a flat circular sector sheet and a formed circular sector which together define a radial passage opening to the outer perimeter of the sector and a plurality of concentric interior passages opening to the radial passage and aligned with the concentric passages of adjacent sectors,
the radial passages of each layer being angularly offset from the radial passages of adjacent layers,
a pocket member attached to each sector and including cup portions having a plurality of cups each opening outwardly in a direction opposite to the direction of rotation of the contactor assembly and a bridge portion disposed at said radial passage and joining the cup portions to each side thereof, said bridge portion being spaced radially outwardly of said cups to provide an opening to said radial passage to either side,
a source of air under pressure,
and a conduit leading from said source of air into said tank and including a plurality of submerged outlets disposed along the length of said tank beneath submerged open cups.

* * * * *

UNITED STATES PATENT OFFICE
CERTIFICATE OF CORRECTION

PATENT NO. : 3,886,074
DATED : May 27, 1975
INVENTOR(S) : David G. Prosser

It is certified that error appears in the above-identified patent and that said Letters Patent are hereby corrected as shown below:

Column 8, line 55
"contactor" should be -- contactors --

Column 9, line 60 (Claim 1)
"froom should be -- from --

Column 12, line 12 (Claim 13)
after "ing" -- between -- should appear

Column 12, line 31 (Claim 14)
after "sector" -- sheet -- should appear

Signed and Sealed this twenty-sixth Day of August 1975

[SEAL]

Attest:

RUTH C. MASON
Attesting Officer

C. MARSHALL DANN
Commissioner of Patents and Trademarks